United States Patent
Hughes et al.

(10) Patent No.: US 6,876,660 B1
(45) Date of Patent: Apr. 5, 2005

(54) METHOD FOR IMPLEMENTING AUTOMATIC PROTECTION SWITCHING (APS) USING CELL REPLICATION

(75) Inventors: David A. Hughes, Mountain View, CA (US); Onchuen D. Lau, Saratoga, CA (US); Frank K. Chui, Sunnyvale, CA (US); Quang H. Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/250,968

(22) Filed: Feb. 16, 1999

(51) Int. Cl.[7] .......................... H04L 12/02; H04L 12/54
(52) U.S. Cl. ..................... 370/395.4; 370/380; 370/390
(58) Field of Search ................ 370/216, 217, 370/218, 221, 230, 235, 389, 390, 395.1, 398, 399, 380, 395.4, 225, 227, 228, 352, 357, 360

(56) References Cited

U.S. PATENT DOCUMENTS

| | | | | |
|---|---|---|---|---|
| 5,202,994 A | * | 4/1993 | Begur et al. ............... | 395/700 |
| 5,301,328 A | * | 4/1994 | Begur et al. ............... | 395/700 |
| 5,751,710 A | * | 5/1998 | Crowther et al. .......... | 370/423 |
| 5,838,924 A | * | 11/1998 | Anderson et al. ...... | 395/200.69 |
| 5,903,544 A | * | 5/1999 | Sakamoto et al. .......... | 370/218 |
| 6,044,061 A | * | 3/2000 | Aybay et al. ............... | 370/230 |
| 6,208,658 B1 | * | 3/2001 | Pickett ....................... | 370/401 |
| 6,272,151 B1 | * | 8/2001 | Gupta et al. ................ | 370/489 |
| 6,317,426 B1 | * | 11/2001 | Afanador et al. .......... | 370/352 |
| 6,317,439 B1 | * | 11/2001 | Cardona et al. ............ | 370/503 |
| 6,351,454 B1 | | 2/2002 | Crocker et al. | |
| 6,370,112 B1 | * | 4/2002 | Voelker ....................... | 370/218 |

OTHER PUBLICATIONS

CISCO, 12012 Gigabit Switch Router Installation and Configuration Guide, publication, 1997, U.S. (also available on the "Documentation" website for Cisco Systems, Inc., http://www.cisco.com/univercd/cc/td/doc/product/core/cis12000/cis12012/fru/4343swfc.htm#xtocid227783, Feb. 29, 2001.

* cited by examiner

*Primary Examiner*—Chau Nguyen
*Assistant Examiner*—Joe Logsdon
(74) *Attorney, Agent, or Firm*—Blakely, Sokoloff, Taylor & Zafman LLP (57) ABSTRACT

A method for cell replication in which a request for data transmission and mapping information are received by a crossbar and a scheduler and are sent by one of a plurality of software configurable slot remap registers. The mapping information is indicative of a destination slot and a backup destination slot to which the data is to be transmitted. The method replicates the data by transmitting the data to the destination slot and to the backup destination slot when the data arrives at an input slot of the crossbar.

28 Claims, 6 Drawing Sheets

| BIT(S) | DEFINITION | RESET VALUE |
|---|---|---|
| 4 | BIT 4 - SLOT00 REDUNDANT MODE | 0 |
| 3:0 | BIT 3:0 - SLOT00 RE-MAP VALUE | 0000 |

| BIT(S) | DEFINITION | RESET VALUE |
|---|---|---|
| 4 | BIT 4 - SLOT01 REDUNDANT MODE | 0 |
| 3:0 | BIT 3:0 - SLOT01 RE-MAP VALUE | 0001 |

| BIT(S) | DEFINITION | RESET VALUE |
|---|---|---|
| 4 | BIT 4 - SLOT02 REDUNDANT MODE | 0 |
| 3:0 | BIT 3:0 - SLOT02 RE-MAP VALUE | 0010 |

⋮

| BIT(S) | DEFINITION | RESET VALUE |
|---|---|---|
| 4 | BIT 4 - SLOT13 REDUNDANT MODE | 0 |
| 3:0 | BIT 3:0 - SLOT13 RE-MAP VALUE | 1101 |

METHOD FOR IMPLEMENTING AUTOMATIC PROTECTION SWITCHING (APS) USING CELL REPLICATION

FIELD OF THE INVENTION

The present invention is related to networks. In particular, the method and apparatus of the present invention relates to Automatic Protection Switching (APS) using cell replication.

BACKGROUND

Automatic Protection Switching (APS) is a means to provide redundancy on Synchronous Optical Network (SONET) equipment to guard against line failures.

There are three types of linear APS modes, namely, 1+1, 1:1 and 1:n. All three modes require that if any failures are detected in a working line, a switch to a protection line must be initiated in 10 msec and completed in 50 msec for a total of 60 msec.

In the linear APS 1+1 mode, for every working line, there is a corresponding redundant protection line. Traffic is carried by both the working and protection lines simultaneously.

In the linear APS 1:1 mode, for every working line, there is a corresponding redundant protection line. However, traffic is normally carried on the working line only. When a failure is detected in the working line, traffic is switched to the protection line.

In the linear APS 1:n mode, for every 'n' working lines, there is a corresponding redundant protection line. Traffic is normally carried on the working lines only. When a failure is detected in a working line, traffic is switched to the protection line.

Currently, APS is implemented electrically through a multiplexer (MUX)/buffer combination on a line card. The disadvantages inherent in the current technology are many. For example, the APS ports must be in predefined locations, typically adjacent to each other. Additionally, the current scheme does not work at high speed signal transmissions. More specifically, although repeating signals at low speed is tolerable, the scheme breaks down at high speeds due to impedance mismatch and capacitive loading.

BRIEF SUMMARY OF THE INVENTION

A method for cell replication in which a request for data transmission and mapping information are received by a crossbar and a scheduler and are sent by one of a plurality of software configurable slot remap registers. The mapping information is indicative of a destination slot and a backup destination slot to which the data is to be transmitted. The method replicates the data by transmitting the data to the destination slot and to the backup destination slot when the data arrives at an input slot of the crossbar.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements in which.

DETAILED DESCRIPTION

A method and apparatus for implementing automatic protection switching using cell replication in a network switch fabric is disclosed. For one embodiment, a switch fabric has a slot that can be "dual-homed" to two slots. For example, if slot X is dual homed to slot X and Y, then any traffic that is destined to X will also go to Y. To avoid programming errors, this feature stipulates that one of the dual-homed slots must be itself. In other words, it is an illegal operation if slot X is dual-homed to Y and Z, where X, Y and Z are different values. For one embodiment, the dual homing feature is implemented through a switch fabric register referenced herein as a slot remap register that is under software control. The software may enable the feature on any slot at any time, disable the feature on any slot at any time and modify the slot numbers at any time.

When slot X is dual-homed to X and Y, a request that goes to either X or Y will be treated as if there is a request going to X and Y. A grant is issued to the requesting slot only if both requests (to X and Y) are granted. This applies to unicast and mulitcast traffic.

There are many intended advantages of the embodiment. For example, it is intended that the embodiment eliminate the predefined locations limitations of prior technology. Further, it is intended that no hardware upgrade be necessary in adding the embodiment as the embodiment is performed through software means.

Figure 1:
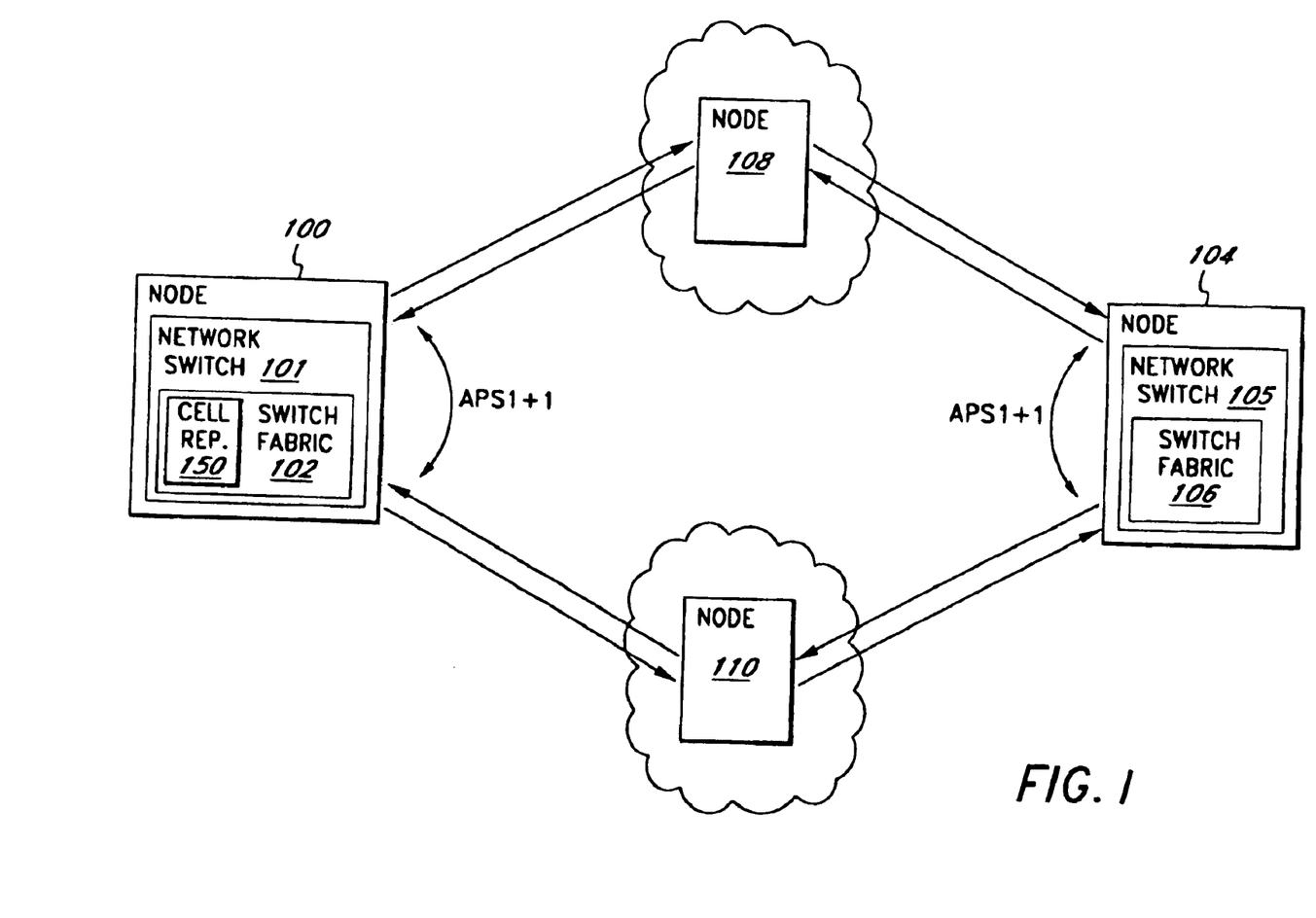
FIG. 1 is a network diagram with an embodiment of a switch fabric with cell replication.

FIG. 1 is a network diagram with an embodiment of a switch fabric with cell replication. A network is a collection of computers, printers, routers, switches and other devices that are able to communicate with each other over some transmission medium. Nodes in a network refer to an endpoint of a network connection or a junction common to two or more lines in a network. Nodes can be processors, controllers, or workstations. Nodes vary in routing and other functional capabilities and can be interconnected by links, and serve as control points in the network.

One embodiment is for a network switch ("switch") which is a chassis based, modular architecture having circuit boards configured to plug into the chassis. A switch is a device that allows a connection to be established as necessary and terminated when there is no longer a session to support.

In the exemplary network diagram, a network node 100 has a network switch 101 with a switch fabric 102. The switch fabric 102 has an APS cell replication feature 150 with a 1+1 implementation where for every working line, there is a corresponding redundant protection line. Traffic is carried by both the working and the protection line simultaneously. A network node 104 also has a network switch 105 having a switch fabric 106 with an APS cell replication feature with a 1+1 implementation. The two intermediate nodes 108 and 110 do not need an APS implementation because they are protected on both sides of the network by the APS cell replication features 150 of nodes 100 and 104.

In an alternate embodiment, the APS cell replication feature can be implemented to protect physical lines between the network nodes.

Figure 2:
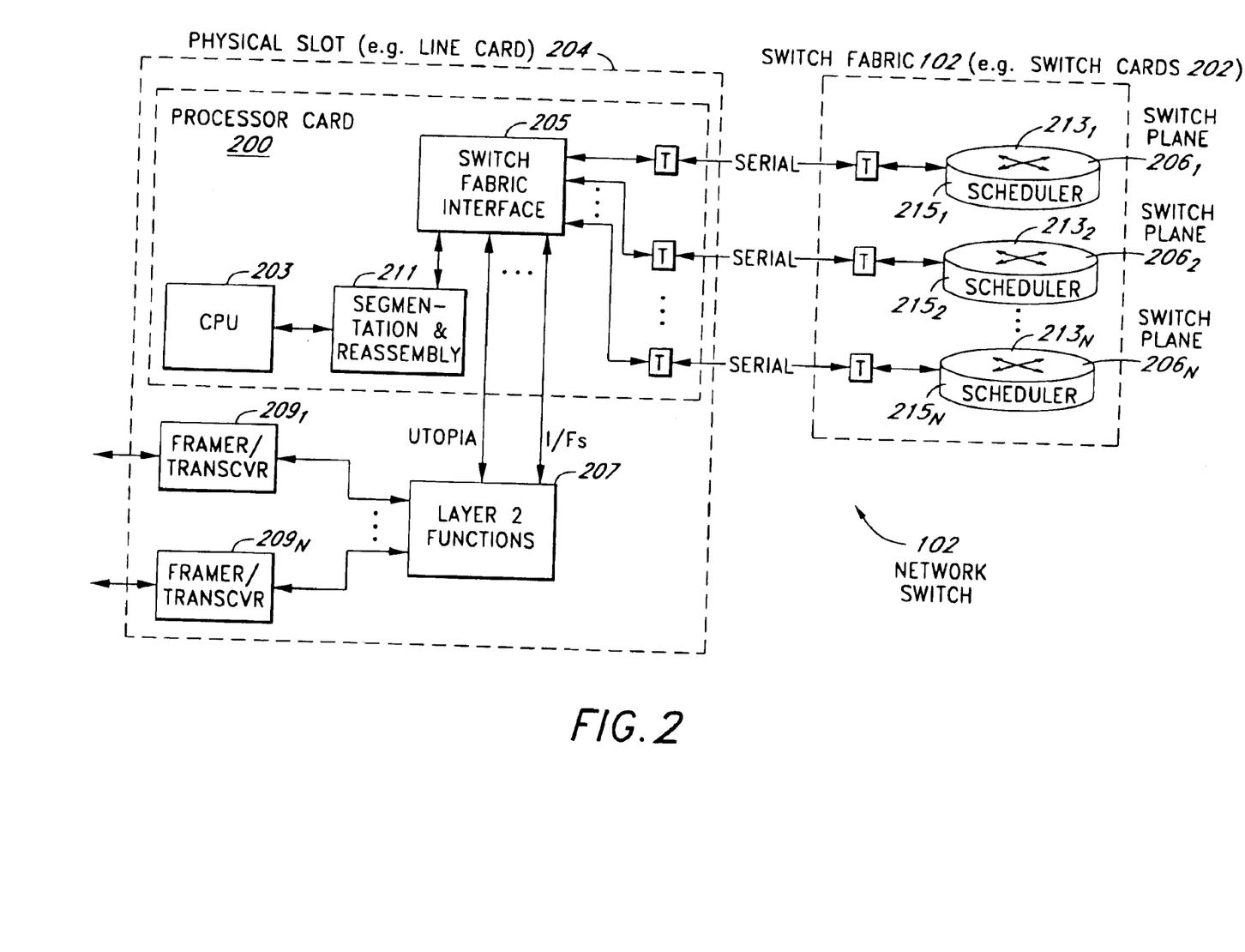
FIG. 2 is a block diagram of an embodiment of a switch fabric.

FIG. 2 is a block diagram of one embodiment of a switch fabric. For one embodiment, a network switch 101, has three types of parts, namely a processor card 200, a switch card 202 (switch fabric 102) and a line card 204. The line card 204 interfaces traffic coming in and out of a physical port with the switch fabric 102. The interface is accomplished through a switch fabric interface 205 that interfaces the switch fabric 102 with a line card 204 and a layer functions 207 which processes data received from and forwarded to the physical port through framers/transceivers $209_1 \ldots 209_N$ into an appropriate format. A processor card 200 is a form of a line card 204 and has the Central Processing Unit (CPU) 203, segmentation and reassembly (SAR) 211 and high level software.

There are a number of switch cards 202 in the system. For one embodiment, there are four switch cards 202. Each switch card 202 has the APS cell replication feature and has of a number of switch planes $206_1 \ldots 206_N$, which are the basic elements of a switch fabric 102. For one embodiment, each switch plane 206 has a crossbar 213 and a scheduler 215. Both the crossbar 213 and the scheduler 215 are discussed in detail in the text accompanying FIGS. 3 and 4.

Between every line card 204 and a switch plane 206 there is a physical connection with one direction of traffic going in to the switch fabric 102 and a direction of traffic going out of the switch fabric 102, resulting in a full duplex connection. For example, given sixteen switch planes, there are sixteen connections between the line card 204 and the switch fabric 102.

For one embodiment, the APS cell replication feature is implemented in the switch fabric 102, more specifically through the crossbar 213 and the scheduler 215.

Figure 3:
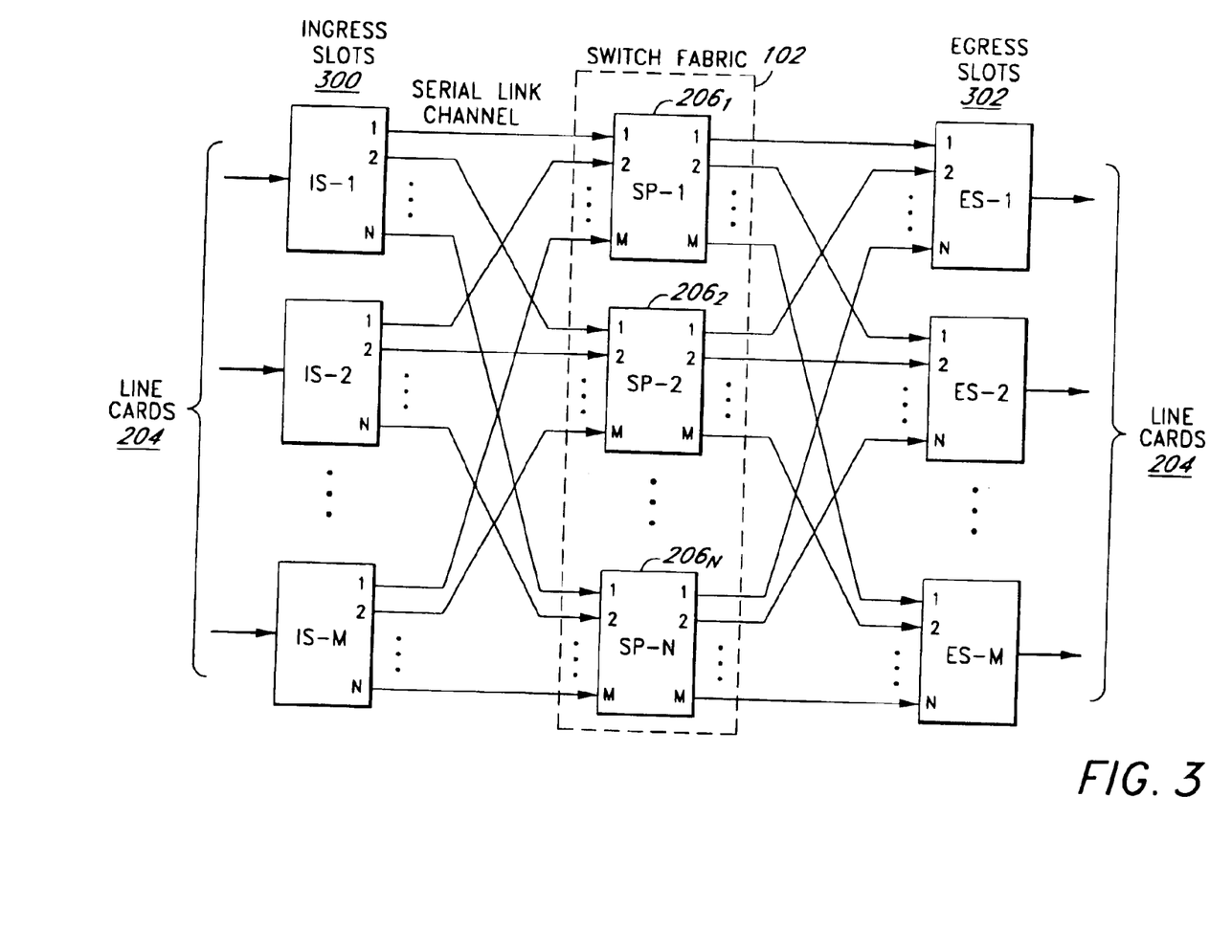
FIG. 3 is an exemplary block diagram of the switch fabric with a crossbar architecture.

FIG. 3 is an exemplary block diagram of the switch fabric with a crossbar architecture. FIG. 3 is illustrated with ingress slots 300 and egress slots 302, which are part of the same line card 204, but logically separate. Once the traffic arrives at a line card 204, requests for transmission made for the traffic comprised of cells are sent to the switch planes $206_1 \ldots 206_N$ of the switch fabric 102.

A switch plane 206 receiving a request determines whether to grant the request or not. If the switch plane 206 determines to grant the request, then in the next time slot the line card 204 submits a cell (also referred to herein as data) and the switch plane 206 switches the destination of the cell to an appropriate alternate destination.

There are a number of line cards 204 submitting requests to the switch fabric 102. The switch fabric 102 determines which requests to provide grants to. The traffic is then sent to the switch fabric 102 where the traffic is "switched" or "routed" to the appropriate destination slots.

The APS cell replication feature repeats a connection using the switch fabric 102. More specifically, a number of registers, referred to herein as slot remap registers, are programmed into each switch planes $206_1 \ldots 206_N$, such that when traffic is passed to an egress slot 1 (ES1), the traffic is also copied to an egress slot 2 (ES2) where ES1 (active line) is protected by ES2 (standby line). Thus, unlike the prior technology that repeats connections electrically, the APS cell replication feature repeats the connections logically through software control and there is no limitation on transmission speed. Additionally, since the APS cell replication feature is controlled logically through software control, a given line can protect "n" or any combination of lines, whereas with prior technology, lines physically next to each other were assigned to each other for APS protection.

Figure 4:
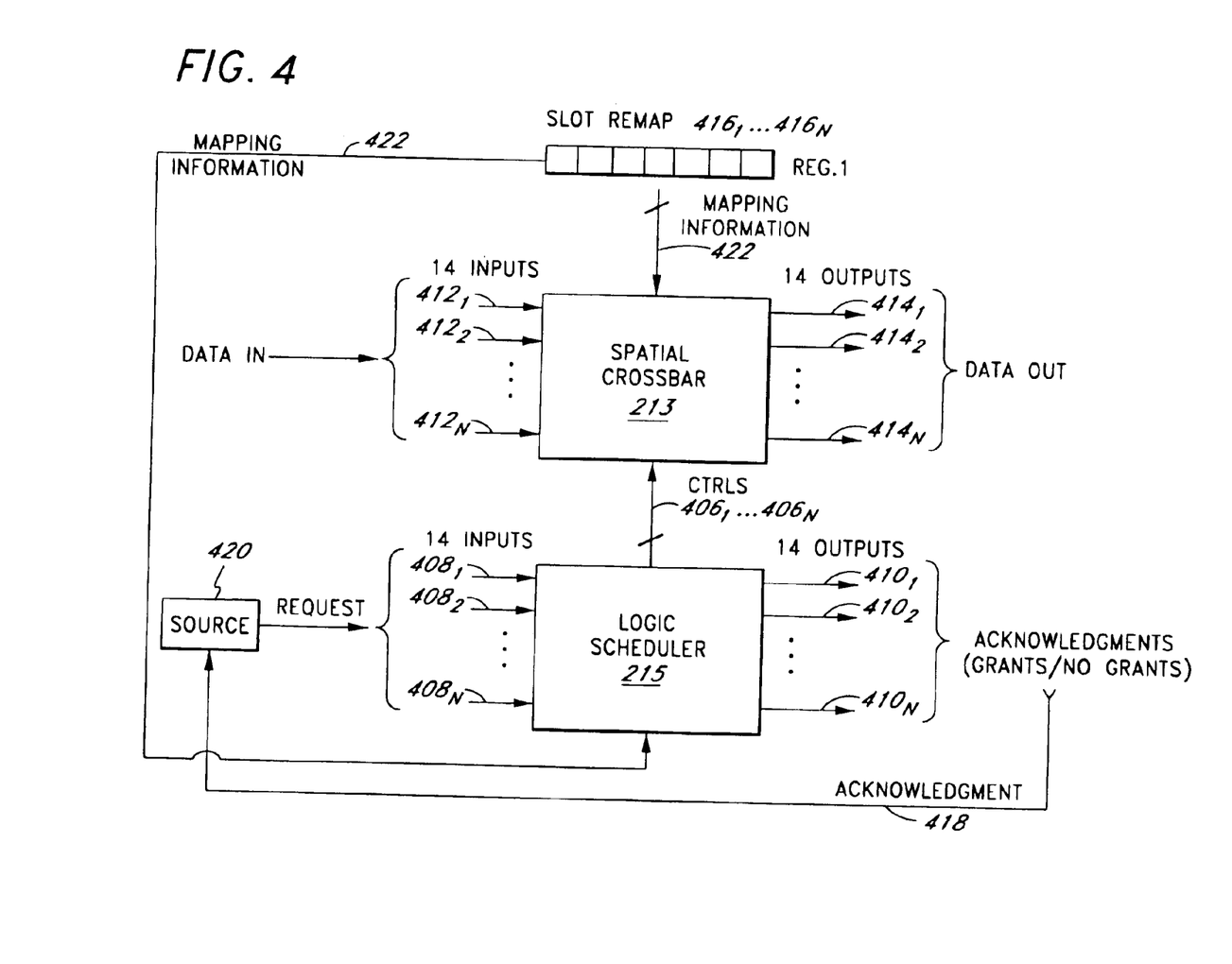
FIG. 4 is a switch plane with an embodiment of an APS cell replication feature.

FIG. 4 is a switch plane with an embodiment of the APS cell replication feature. For one embodiment, a switch plane having the APS cell replication feature may be implemented with a switch ASIC 400. For one embodiment, there are two entities within the switch plane 206, namely a crossbar 213, which includes gates to direct traffic, and a scheduler 215 that controls the crossbar 213.

For one embodiment, the scheduler 215 has N signal inputs $408_1 \ldots 408_N$ and N signal outputs $410_1 \ldots 410_N$ and provides control signals $406_1 \ldots 406_N$ to the crossbar 213. The signal inputs $408_1 \ldots 408_N$ to the scheduler 215 are requests for data transmission through the crossbar 213, and the signal outputs $410_1 \ldots 410_N$ are grants (i.e. acknowledgements to the requests).

The crossbar 213 has N data in signals $412_1 \ldots 412_N$ and N data out signals $414_1 \ldots 414_N$ and is an N by N spatial crossbar that may have N concurrent events such as N data coming in and N data going out. Only data for which a request for transmission is granted by the scheduler 215 is processed through the crossbar 213.

Both the crossbar 213 and the scheduler 215 receive mapping information 422 from software configurable slot remap registers $416_1 \ldots 416_N$. Mapping information 422 identifies the data out destination slots $414_1 \ldots 414_N$ to which data is to be transmitted through the crossbar 213.

For one embodiment, each of the N slot remap registers $416_1 \ldots 416_N$ corresponds with a sequential one of "data in" signals $412_1 \ldots 412_N$ of the crossbar 213. For example, slot remap register $416_1$ corresponds to data in signal $412_1$.

When a request comes in to, for example, input slot $408_1$ of the scheduler 215, the scheduler 215 receives the corresponding mapping information 422 from the slot remap register $416_1$. The scheduler 215 then determines whether the destination slot and the backup destination slot as identified by the mapping information 422 for input slot 408, are valid based on the result of arbitration (i.e., whether the destination slot and the backup destination slot are available). For example, the scheduler 215 may grant requests based on some type of priority scheme whereby a grant with the highest predetermined priority is granted a request first and so on. The form of arbitration to select which destination slot to grant next may vary and is not limited to a priority scheme based arbitration.

Once validity is confirmed, the scheduler 215 transmits a control signal 406 to the crossbar 213 which indicates that $412_1$ is permitted to send a cell to its intended destination slot and the backup destination slot. Additionally, an acknowledgment 418 is sent back to the source 420 of the request, such as an ingress line card. When the data comes in to the crossbar 213, the crossbar 213 knows which route to take the data by the slot identified by the mapping information 422.

Figure 5:
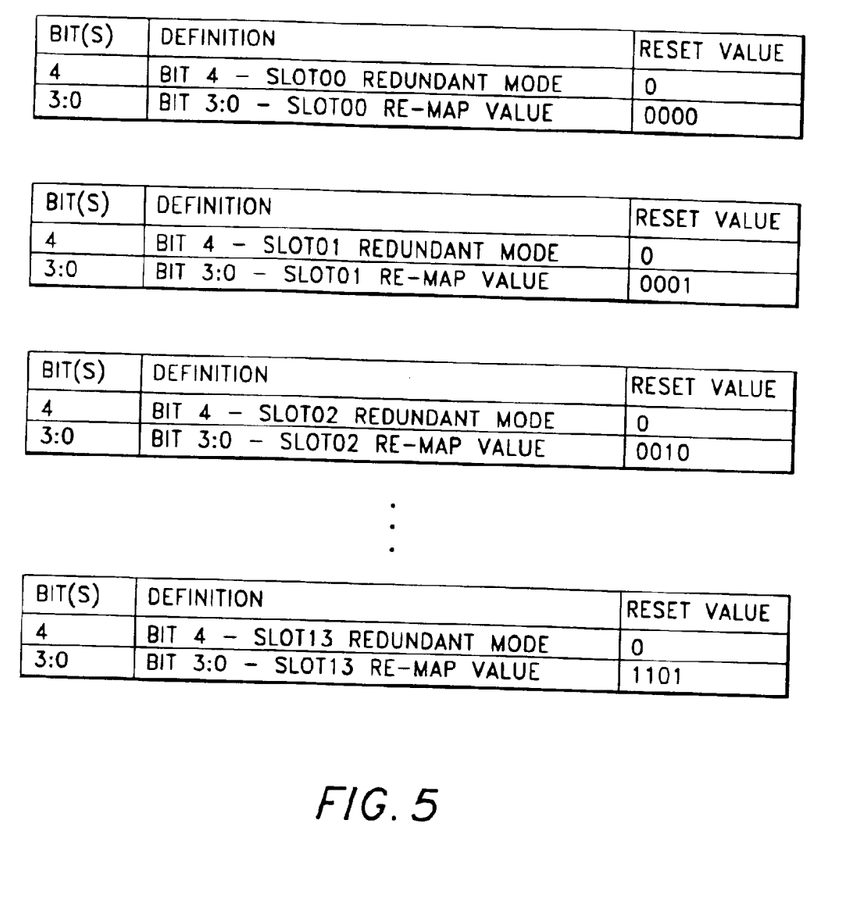
FIG. 5 illustrate exemplary registers.

FIG. 5 illustrates exemplary slot remap registers. In the illustrated embodiment, there are fourteen registers with five bits and the most significant bit, bit four, determines whether the corresponding traffic is to go to two slots (i.e., "redundant mode"). The four lower bits determine the identity of the current backup slot (i.e., "remap value"). Each register of the slot remap registers $416_1 \ldots 416_N$ may correspond with one slot (one-to-one correspondence with 14 registers and 14 slots). The backup slot is assigned to 1 to N slots. In an alternate embodiment, a backup slot is assigned to one specific slot.

The slot remap registers $416_1 \ldots 416_N$ are software configurable. The setting of the slot remap registers $416_1 \ldots$ $416_N$ may be changed at any given time, the effect of which will take place the next time count. There are two scenarios for which the slot remap registers $416_1 \ldots 416_N$ may be reprogrammed to match slots with a changed backup slot. In one scenario, a system that is non-redundant is to be made redundant. In a second scenario, a system's network topology is changed, for instance, network topology may change as more connections are added to the system and connections are deleted due to an increase in network users. Alternatively, the topology of the user changes and the user may want to reconfigure the APS logic. Thus, there are three options for the APS logic, namely, addition, deletion, or reconfiguration of the backup slots. The slot remap registers $416_1 \ldots 416_N$ may be re-programmed accordingly.

Figure 6:
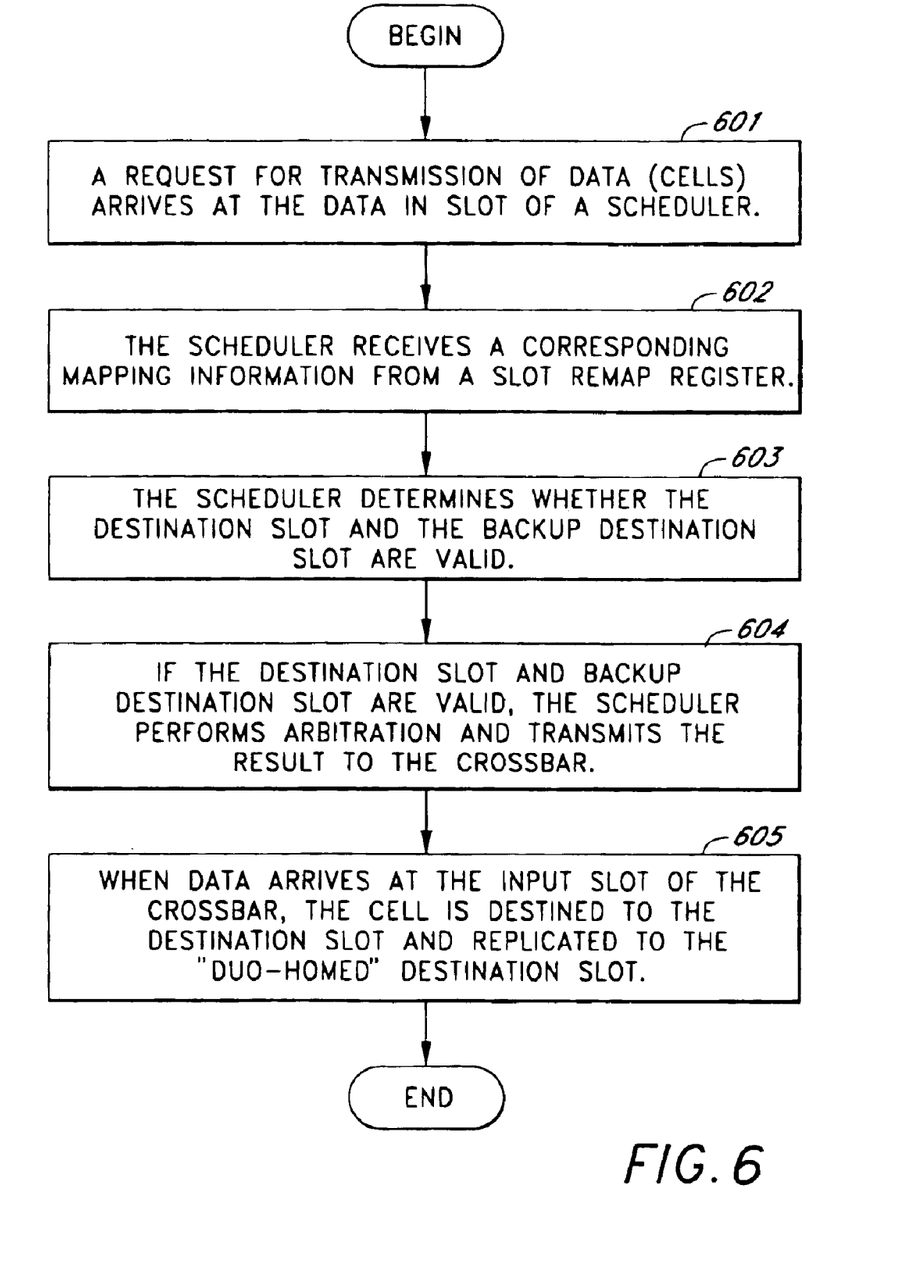
FIG. 6 is a flow chart showing the general steps of APS using cell replication.

FIG. 6 is a flow diagram illustrating the general steps followed by one embodiment. In step 601, a request comes in to the scheduler 215. In step 602, the scheduler 215 receives the corresponding mapping information 422 from the slot remap registers $416_1 \ldots 416_N$. In step 603, the scheduler 215 then determines whether the slot and the backup slot to grant the request to are valid (i.e., available). If the requests are not valid, then a grant will not be issued to the source of the request. In step 604, once validity is confirmed, the scheduler 215 transmits a control signal 406 to the crossbar 213 that indicates that the slot and the backup slot are available. In step 605, when data arrives at the input slot of the crossbar 213, the crossbar 213 transmits the data to its destination slot and replicates the data cell by transmitting the data to the duo-homed backup destination slot.

What has been described is a method and apparatus that logically duplicates cells in the switch fabric as opposed to performing the APS electrically.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. A method for cell replication comprising:
   receiving a request for data transmission through a crossbar and a corresponding mapping information, the mapping information received from one of a plurality of software configurable registers by the crossbar and a scheduler, the mapping information indicative of a destination slot and a backup destination slot to which the data is to be transmitted; and
   replicating the data by transmitting the data to the destination slot and to the backup destination slot when the data arrives at an input slot of the crossbar.

2. The method of claim 1 further comprising determining whether the destination slot and the backup destination slot to grant the request are available, the availability determined by the scheduler.

3. The method of claim 2 further comprising transmitting a control signal to the crossbar once availability is confirmed, the control signal transmitted by the scheduler and indicative of the availability of the destination slot and the backup destination slot.

4. The method of claim 3 further comprising sending an acknowledgment back to a source of the request.

5. An apparatus for cell replication comprising:
   a crossbar to direct data traffic;
   a plurality of software configurable registers coupled to the crossbar; and
   a scheduler coupled to the crossbar and the plurality of software configurable registers, the cross bar and the scheduler being coupled to receive mapping information from the plurality of software configurable registers, the scheduler comprising a plurality of signal inputs and a plurality of signal outputs and configured to provide control signals to the crossbar, the plurality of signal inputs being requests for data transmission through the crossbar, and the plurality of signal outputs being grants to the requests, data for which a request for transmission being granted by the scheduler to be replicated and processed through the crossbar to a destination slot and to a backup destination slot according to the mapping information.

6. The apparatus of claim 5 wherein the crossbar is a spatial crossbar and has a plurality of data in signals and a plurality of data out signals.

7. The apparatus of claim 6 wherein the mapping information identifies the data out destination slots of the crossbar to which data is to be transmitted through the crossbar.

8. The apparatus of claim 7 wherein each of the plurality of software configurable registers corresponds with one of the plurality of data in signals of the crossbar.

9. The apparatus of claim 8 wherein each of the plurality of software configurable registers corresponds with a sequential one of the plurality of data in signals of the crossbar.

10. The apparatus of claim 8 wherein the scheduler receives mapping information indicative of the destination slot and the backup destination slot from at least one of plurality of software configurable registers when a request comes in to one of the plurality of input slots.

11. The apparatus of claim 10 wherein the scheduler is configured to determines whether the destination slot and the backup destination slot as identified by the mapping information for the specific input slot are available.

12. The apparatus of claim 11 wherein the scheduler is configured to transmits a control signal to the crossbar which indicates that data in slot is permitted to send a cell to its intended the destination slot and the backup destination slot once the availability is confirmed.

13. The apparatus of claim 12 wherein the scheduler is configured to sends an acknowledgment back to a source of the request.

14. A network switch system comprising:
   a plurality of processor cards comprising a central processing unit and high level software;
   a plurality of switch cards coupled to the plurality of processor cards and implemented with a cell replication feature, the plurality of switch cards comprised of a plurality of switch planes;
   a plurality of line cards coupled to the plurality of switch cards, the plurality of line cards to interface the plurality of switch cards with traffic coming in and out of a plurality of physical ports, wherein the cell replication feature further comprises:
   a crossbar to direct data traffic; and
   a scheduler coupled to the crossbar, the scheduler comprising a plurality of signal inputs and a plurality of signal outputs and configured to provide control signals to the crossbar, the plurality of signal inputs being requests for data transmission through the crossbar, and the plurality of signal outputs being grants to the requests, data for which a request for transmission being granted by the scheduler to be replicated and processed through the crossbar to a destination slot and to a backup destination slot according to software configurable mapping information.

15. The system of claim 14 wherein the crossbar is a spatial crossbar and has a plurality of data in signals and a plurality of data out signals.

16. The system of claim 15 further comprising a plurality of registers coupled to the crossbar and the scheduler, the plurality of registers being software configurable and configured to provide the mapping information to the crossbar and the scheduler, the mapping information identifies the data out destination slots of the crossbar to which data is to be transmitted through the crossbar.

17. The system of claim 16 wherein each of the plurality of registers corresponds with one of the plurality of data in signals of the crossbar.

18. The system of claim 17 wherein each of the plurality of registers corresponds with a sequential one of the plurality of data in signals of the crossbar.

19. The system of claim 18 wherein the scheduler is configured to receives mapping information indicative of the destination slot and the backup destination slot from at least one of the plurality of registers when a request comes in to one of the plurality of input slots.

20. The system of claim 19 wherein the scheduler is configured to determines whether the destination slot and the backup destination slot as identified by the mapping information for the specific input slot are available.

21. The system of claim 20 wherein the scheduler is configured to transmits a control signal to the crossbar which indicates that data in slot is permitted to send a cell to its intended the destination slot and the backup destination slot once the availability is confirmed.

22. The system of claim 21 wherein the scheduler is configured to sends an acknowledgment back to a source of the request.

23. A machine-readable medium that provides instructions, which when executed by a machine, cause said machine to perform operations comprising:

receiving a request for data transmission through a crossbar and a corresponding mapping information, the mapping information received from one of a plurality of software configurable registers by the crossbar and a scheduler, the mapping information indicative of a destination slot and a backup destination slot to which the data is to be transmitted; and replicating the data by transmitting the data to the destination slot and to the backup destination slot when the data arrives at an input slot of the crossbar.

24. The machine readable medium of claim 23 further comprising determining whether the destination slot and the backup destination slot to grant the request are available, the availability determined by the scheduler.

25. The machine readable medium of claim 24 further comprising transmitting a control signal to the crossbar once availability is confirmed, the control signal transmitted by the scheduler and indicative of the availability of the destination slot and the backup destination slot.

26. The machine readable medium of claim 25 further comprising sending an acknowledgment back to a source of the request.

27. An apparatus for cell replication, comprising:

means for receiving a request for data transmission through a crossbar and a corresponding mapping information, the mapping information received from one of a plurality of software configurable registers by the crossbar and a scheduler, the mapping information indicative of a destination slot and a backup destination slot to which the data is to be transmitted; and means for replicating the data by transmitting the data to the destination slot and to the backup destination slot when the data arrives at an input slot of the crossbar.

28. The apparatus of claim 27, further comprising means for determining whether the destination slot and the backup destination slot as identified by the mapping information for the specific input slot are available; and means for transmitting a control signal to the crossbar which indicates that data in slot is determined to send a cell to its intended the destination slot and the backup destination slot once the availability is confirmed.

* * * * *